US012646514B2

(12) United States Patent
Feng et al.

(10) Patent No.: US 12,646,514 B2
(45) Date of Patent: Jun. 2, 2026

(54) POWER-SENSITIVE CONTROL OF VIRTUAL AGENTS

(71) Applicant: Apple Inc., Cupertino, CA (US)

(72) Inventors: Dan Feng, Sunnyvale, CA (US); Behrooz Mahasseni, Los Altos, CA (US); Bo Morgan, Santa Cruz, CA (US); Daniel L. Kovacs, Los Angeles, CA (US); Mu Qiao, Campbell, CA (US)

(73) Assignee: APPLE INC., Cupertino, CA (US)

( * ) Notice: Subject to any disclaimer, the term of this patent is extended or adjusted under 35 U.S.C. 154(b) by 73 days.

(21) Appl. No.: 18/226,536

(22) Filed: Jul. 26, 2023

(65) Prior Publication Data

US 2024/0038228 A1 Feb. 1, 2024

Related U.S. Application Data

(60) Provisional application No. 63/392,659, filed on Jul. 27, 2022.

(51) Int. Cl.
*G06F 1/32* (2019.01)
*G10L 15/22* (2006.01)

(52) U.S. Cl.
CPC ........ *G10L 15/22* (2013.01); *G10L 2015/228* (2013.01)

(58) Field of Classification Search
CPC ............. G06F 1/32; G06F 3/167; G10L 15/22
See application file for complete search history.

(56) References Cited

U.S. PATENT DOCUMENTS

| | | | | |
|---|---|---|---|---|
| 8,706,172 B2 * | 4/2014 | Priyantha | .............. | G06F 1/3293 |
| | | | | 455/574 |
| 10,250,976 B1 * | 4/2019 | Horii | ...................... | H04R 3/005 |
| 10,401,943 B2 * | 9/2019 | Cronin | .................. | G06F 1/3206 |
| 11,009,970 B2 | 5/2021 | Hindi et al. | | |
| 11,526,205 B2 * | 12/2022 | Han | ........................ | G06F 1/3234 |
| 12,205,210 B2 * | 1/2025 | Lebaredian | ............. | G06F 3/167 |
| 2010/0302028 A1 * | 12/2010 | Desai | .................... | G06F 1/3206 |
| | | | | 340/539.3 |
| 2020/0410237 A1 * | 12/2020 | Soryal | ..................... | G06F 3/012 |
| 2021/0134286 A1 | 5/2021 | Burton et al. | | |
| 2023/0207120 A1 * | 6/2023 | Wu | ........................ | G06N 3/044 |
| | | | | 705/2 |

FOREIGN PATENT DOCUMENTS

WO 2018049430 A2 3/2018

* cited by examiner

*Primary Examiner* — Daniel Abebe
(74) *Attorney, Agent, or Firm* — Fernando & Partners, LLP

(57) ABSTRACT

In some implementations, a method includes displaying, on a display, an environment that includes a representation of a virtual agent that is associated with a sensory characteristic. In some implementations, the method includes selecting, based on the sensory characteristic associated with the virtual agent, a subset of a plurality of sensors to provide sensor data for the virtual agent. In some implementations, the method includes providing the sensor data captured by the subset of the plurality of sensors to the virtual agent in order to reduce power consumption of the device. In some implementations, the method includes displaying a manipulation of the representation of the virtual agent based on an interpretation of the sensor data by the virtual agent.

24 Claims, 10 Drawing Sheets

200

| Display an environment that includes a representation of a virtual agent | ~210 |

Select a subset of a plurality of sensors based on a sensory characteristic of the virtual agent
Select audio sensor when audio resp. exceeds threshold 220a
Select image sensor when visual resp. exceeds threshold 220b
Select tactile sensor when tactile resp. exceeds threshold 220c ~220
Select sensors at different rates 220d
Rate of sensor data capture is based on device or user state 220e Provide sensor data from the subset to the virtual agent
Sensor data indicates an intent of a user 230a ~230

Display a manipulation of the representation of the virtual agent
Provide appearance that virtual agent is performing an action 240a ~240

200

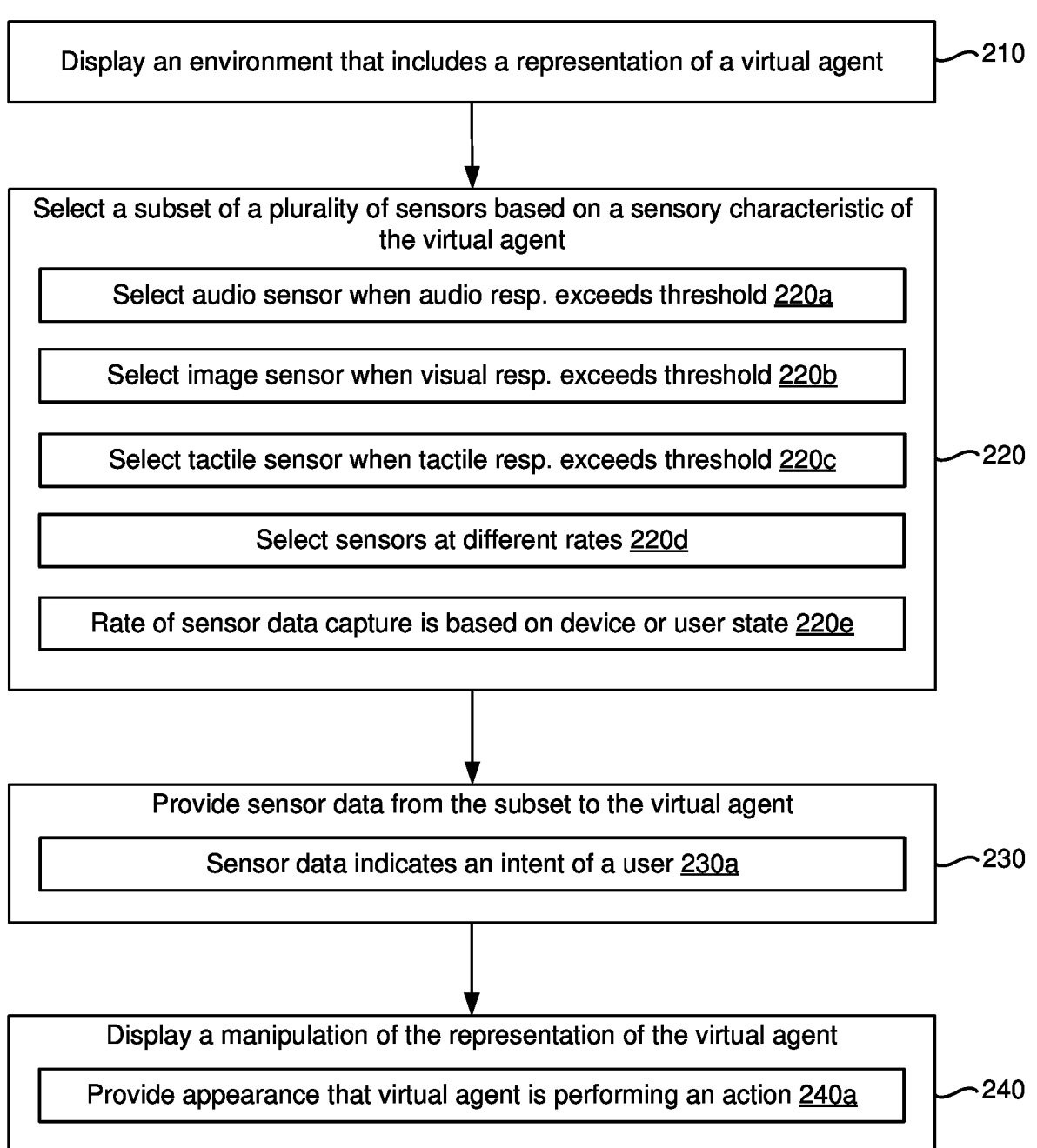

Display an environment that includes a representation of a virtual agent — 210

Select a subset of a plurality of sensors based on a sensory characteristic of the virtual agent Select audio sensor when audio resp. exceeds threshold 220a Select image sensor when visual resp. exceeds threshold 220b Select tactile sensor when tactile resp. exceeds threshold 220c Select sensors at different rates 220d Rate of sensor data capture is based on device or user state 220e

— 220

Provide sensor data from the subset to the virtual agent

Sensor data indicates an intent of a user 230a

— 230

Display a manipulation of the representation of the virtual agent

Provide appearance that virtual agent is performing an action 240a

CPU(s)
301

Network
Interface
302

305

I/O device(s)
308

Programming
Interface
303

Memory 304

Operating System 306

Data obtainer 310

Instructions 310a

Heuristics & Metadata 310b

Selector 320

Instructions 320a

Heuristics & Metadata 320b

Virtual agent 330

Sensory characteristic 332

Sensor data interpreter 334

Representation manipulator 336

Instructions 330a

Heuristics & Metadata 330b

POWER-SENSITIVE CONTROL OF VIRTUAL AGENTS

CROSS-REFERENCE TO RELATED APPLICATION

This application claims the benefit of U.S. Provisional Patent App. No. 63/392,659, filed on Jul. 27, 2022, which is incorporated by reference in its entirety.

TECHNICAL FIELD

The present disclosure generally relates to power-sensitive control of virtual agents.

BACKGROUND

Some devices include a display that presents visual content. Some devices implement a virtual agent. Such devices can display a representation of the virtual agent as visual content. Some virtual agents respond to some inputs. However, capturing various inputs tends to consumer power.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2 is a flowchart representation of a method of selectively providing sensor data to a virtual agent in accordance with some implementations.

Figure 1A:
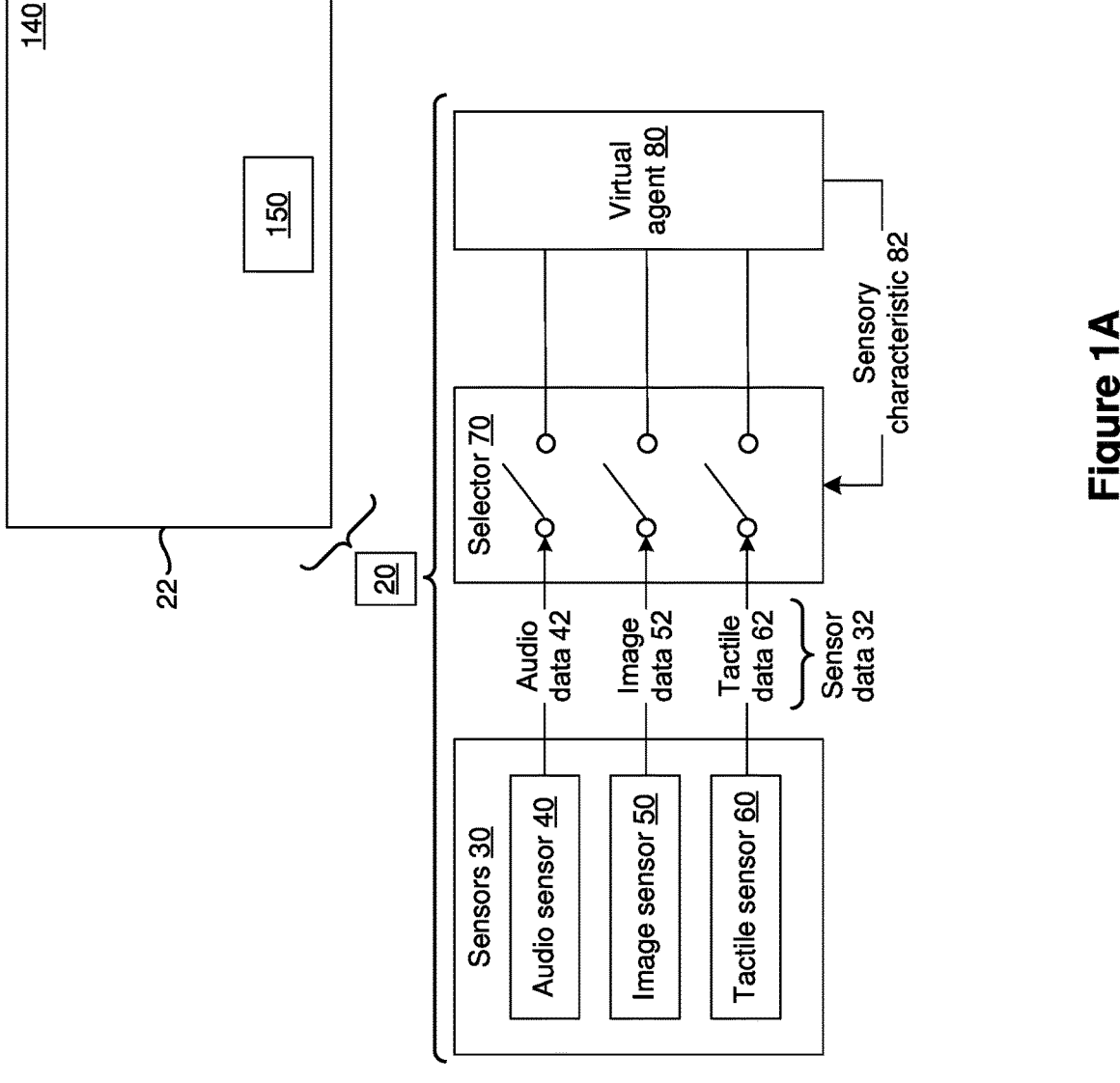
FIGS. 1A-1H are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for selecting sensors that provide sensor data for a virtual agent. In some implementations, the method is performed by a device including a display, a plurality of sensors, a non-transitory memory and one or more processors. In some implementations, the method includes displaying, on the display, an environment that includes a representation of a virtual agent that is associated with a sensory characteristic. In some implementations, the method includes selecting, based on the sensory characteristic associated with the virtual agent, a subset of the plurality of sensors to provide sensor data for the virtual agent. In some implementations, the method includes providing the sensor data captured by the subset of the plurality of sensors to the virtual agent in order to reduce power consumption of the device. In some implementations, the method includes displaying a manipulation of the representation of the virtual agent based on an interpretation of the sensor data by the virtual agent.

In accordance with some implementations, a device includes one or more processors, a plurality of sensors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some devices implement a virtual agent and display an XR representation of the virtual agent in an XR environment. The virtual agent interprets sensor data and the device manipulates the XR representation of the virtual agent based on an interpretation of the sensor data. The interpretation of the sensor data indicates an intent of a user of the device. If the sensor data provided to the virtual agent for intent recognition is limited to certain types of sensor data such as verbal inputs, the virtual agent may not be able to successfully recognize the user's intent. If the virtual agent is not successful at recognizing the user's intent, the virtual agent may not act according to the user's intent thereby appearing unresponsive to the user's commands and detracting from a user experience of the device. On the other hand, if the sensor data provided to the virtual agent is not limited, the virtual agent may have to analyze a broad spectrum of sensor data thereby resulting in a relatively high resource consumption. For example, analyzing an entirety of the sensor data may require a certain amount of memory and/or power. The amount of power required to analyze the entirety of the sensor data may significantly drain a battery of the device. Moreover, capturing sensor data that the virtual agent is not trained to interpret or respond to may unnecessarily drain the battery of the device.

The present disclosure provides methods, systems, and/or devices for limiting sensor data that is provided to a virtual agent in order to conserve resources. The sensor data provided to the virtual agent is limited based on a sensory characteristic of the virtual agent. The sensory characteristic may indicate a type of sensor data that the virtual agent is configured to interpret. Limiting the sensor data provided to the virtual agent based on the sensory characteristic helps ensure that the virtual agent is not unnecessarily provided sensor data that the virtual agent is not capable of interpreting and the device does not unnecessarily capture sensor data that the virtual agent is not capable of interpreting. Forgoing providing sensor data that the virtual agent cannot interpret conserves power that may be required to capture, interpret and/or act upon the sensor data that the virtual agent cannot interpret.

As an example, if the virtual agent represents a dog that responds to sound variations and hand gestures but does not react to conversational speech or touch, the device can limit the sensor data that is provided to the virtual agent to auditory analytics data (e.g., data that indicates a pitch and/or an amplitude of the user's voice) and image data that indicates gestures being made by the user, and exclude conversational speech data (e.g., sentences being spoken by the user) and tactile data (e.g., contact between the virtual dog and a collider object representing the user's hand). In this example, not providing conversational speech data (e.g., the sentences being spoken by the user) conserves power because the virtual agent does not have to analyze the user's sentences to determine how the XR representation of the virtual agent ought to react to the user's sentences. Similarly, not providing the tactile data conserves power because the virtual agent does not have to analyze the tactile data to determine how the XR representation of the virtual agent ought to react to virtual touches. The device may turn off an audio sensor that captures the conversational speech data and/or a tactile sensor that captures the tactile data in order to conserve power that the audio sensor and/or the tactile sensor consume.

When an XR representation of a virtual agent lacks a body part, the device can forgo providing sensor data that is associated with (e.g., detected by) that body part. As an example, if the virtual agent represents a jellyfish that lacks an ear and an eye, then the device can limit the sensor data provided to the virtual agent to tactile data and forgo providing audio data and/or visual data. In this example, since the virtual agent represents a jellyfish that cannot hear or see but can feel the presence of the user, the device can provide tactile data and forgo providing speech data, audio analytics data and image data. For example, the device can provide the virtual agent with tactile inputs (e.g., the user touching the XR representation of the jellyfish) and forgo providing verbal inputs (e.g., user sentences being spoken to the XR representation of the jellyfish), environmental sound variations (e.g., pitch information and amplitude information) and visual inputs (e.g., images of the user performing actions). Limiting inputs of the jellyfish virtual agent to tactile inputs conserves power because the jellyfish virtual agent does not have to process verbal, auditory and/or visual inputs. Moreover, the device can leave the tactile sensor on, and turn off the audio sensor and the image sensor in order to conserve power.

Different types of sensor data can be provided to a virtual agent at different rates. The sensory characteristic of the virtual agent may indicate priorities for different types of sensor data. Sensor data that is associated with a higher priority can be provided to the virtual agent more frequently whereas sensor data that is associated with a lower priority can be provided to the virtual agent less frequently. Providing lower priority sensor data less frequently tends to reduce resource consumption by allowing the device to capture the lower priority sensor data less frequently. As such, a sensor that captures the lower priority sensor data may be turned off when the sensor is not capturing the sensor data. As an example, if the virtual agent represents a dog, auditory inputs can be given a higher priority over visual inputs. For example, auditory inputs can be provided to the virtual agent more often than the visual inputs. Reducing a rate at which visual inputs are provided to the virtual agent conserves power because the device has to analyze the visual inputs less often and the device can intermittently turn off the image sensor.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20 and a user (not shown) of the electronic device 20.

In some implementations, the electronic device 20 includes a handheld computing device that can be held by the user. For example, in some implementations, the electronic device 20 includes a smartphone, a tablet, a media player, a laptop, or the like. In some implementations, the electronic device 20 includes a wearable computing device that can be worn by the user. For example, in some implementations, the electronic device 20 includes a head-mountable device (HMD) or an electronic watch.

In various implementations, the electronic device 20 includes a display 22 and various sensors 30 that capture sensor data 32. In some implementations, the sensors 30 include an audio sensor 40 (e.g., a microphone) that receives an audible signal and converts the audible signal into audible signal data (hereafter "audio data 42"). In some implementations, the sensors include an image sensor 50 (e.g., a camera) that captures image data 52 (e.g., images of the physical environment 10 and/or images of the user of the electronic device 20). In some implementations, the sensors 30 include a tactile sensor 60 that captures tactile data 62 that corresponds to tactile inputs (e.g., touch inputs). The sensors 30 may include other sensors that are not shown in FIG. 1A. For example, the sensors 30 may include an environmental sensor that captures environmental data. As an example, the sensors 30 may include a depth sensor that captures depth data, a temperature sensor that captures a temperature reading, a pressure sensor that captures a pressure reading, an ambient light sensor (ALS) that captures an ambient lighting level, etc.

In various implementations, the electronic device 20 includes a virtual agent 80. In some implementations, the electronic device 20 includes a set of executable instructions that implement the virtual agent 80. The virtual agent 80 is trained to interpret the sensor data 32 and generate a response in order to provide an appearance that the virtual agent 80 is responsive to the physical environment 10 including user inputs and interactions. In some implementations, the virtual agent 80 utilizes a machine-learned model to interpret the sensor data 32 and generate responses. In some implementations, the virtual agent 80 utilizes a set of one or more neural network systems (e.g., one or more neural networks) that selectively receives a portion of the sensor data 32 as inputs and generates responses as outputs. In some implementations, the display 22 displays an XR environment 140 that includes an XR representation 150 of the virtual agent 80. In some implementations, the XR representation 150 may be referred to as an avatar of the virtual agent 80. In some implementations, the electronic device 20 manipulates the XR representation 150 in order to provide an appearance that the XR representation 150 is performing an action in response to the virtual agent 80 detecting the sensor data 32. In some implementations, the virtual agent 80 is referred to as an intelligent virtual agent or a virtual assistant.

In some implementations, the virtual agent 80 is trained to represent an entity and a visual appearance of the XR representation 150 resembles a visual appearance of the entity. In some implementations, the entity that the virtual agent 80 represents is a real-world living being such as a dog, a jellyfish, a lion, etc. In some implementations, the entity that the virtual agent 80 represents is a fictional living being such as a dragon or an alien. In some implementations, the virtual agent 80 is trained to represent an entity from a fictional work such as a novel, a movie or a comic book. In some implementations, the virtual agent 80 is trained to represent an inanimate object such as a robot, a vacuum cleaner or a drone.

In various implementations, the virtual agent 80 is associated with a sensory characteristic 82 that indicates a type of the sensor data 32 that the virtual agent 80 is configured to (e.g., trained to) interpret and respond to. In some implementations, the electronic device 20 includes a selector 70 that selectively provides a portion of the sensor data 32 to the virtual agent 80 based on the sensory characteristic 82 of the virtual agent 80 while forgoing providing a remainder of the sensor data 32 to the virtual agent.

Figure 1B:
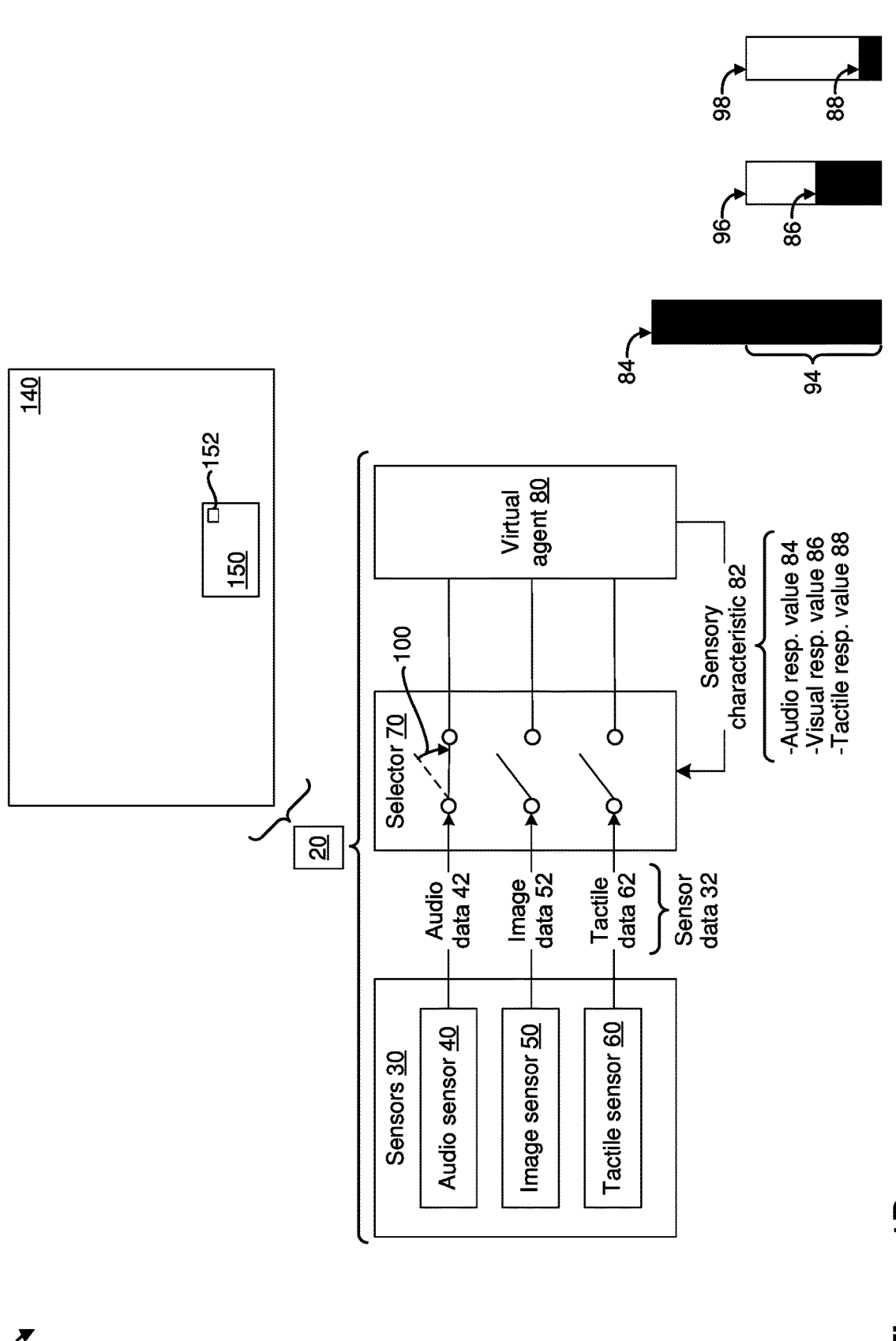

In the example of FIG. 1B, the sensory characteristic 82 includes an audio responsiveness value 84 that indicates a level of responsiveness of the virtual agent 80 to the audio data 42. In some implementations, the selector 70 selects the audio sensor 40 to provide the audio data 42 to the virtual agent 80 when the audio responsiveness value 84 is greater than an audio responsiveness threshold 94. As indicated by an arrow 100, the selector 70 provides the audio data 42 to the virtual agent 80 since the audio responsiveness value 84 is greater than the audio responsiveness threshold 94. In the example of FIG. 1B, the XR representation 150 of the virtual agent 80 includes an XR ear 152 (e.g., a virtual ear). In some implementations, the selector 70 determines that the virtual agent 80 can interpret and generate a response to the audio data 42 based on a presence of the XR ear 152. More generally, in various implementations, the selector 70 determines the sensory characteristic 82 based on a component of the XR representation 150.

In some implementations, the virtual agent 80 is configured to (e.g., trained to) interpret and generate a response to the audio data 42 when the audio responsiveness value 84 is greater than the audio responsiveness threshold 94. For example, the virtual agent 80 is configured to respond to environmental sounds and/or user speech detected by the audio sensor 40 when the audio responsiveness value 84 is greater than the audio responsiveness threshold 94. As such, in this example, the selector 70 selects the audio sensor 40 to provide the audio data 42 to the virtual agent 80. In some implementations, the virtual agent is not configured to interpret and generate a response to the audio data 42 when the audio responsiveness value 84 is less than the audio responsiveness threshold 94. For example, the virtual agent 80 may not be configured to respond to environmental sounds and/or user speech detected by the audio sensor 40 when the audio responsiveness value 84 is less than the audio responsiveness threshold 94. As such, in this example, the selector 70 does not select the audio sensor 40 to provide the audio data 42 to the virtual agent 80. In some implementations, when the audio responsiveness value 84 is greater than the audio responsiveness threshold 94, the electronic device 20 manipulates the XR representation 150 of the virtual agent 80 to indicate that the virtual agent 80 is responsive to the audio data 42.

In some implementations, the sensory characteristic 82 includes a visual responsiveness value 86 that indicates a level of responsiveness of the virtual agent 80 to the image data 52. In some implementations, the selector 70 selects the image sensor 50 to provide the image data 52 to the virtual agent 80 when the visual responsiveness value 86 is greater than a visual responsiveness threshold 96. In the example of FIG. 1B, the selector 70 does not provide the image data 52 to the virtual agent 80 since the visual responsiveness value 86 is less than the visual responsiveness threshold 96. In the example of FIG. 1B, the XR representation 150 of the virtual agent 80 does not include an XR eye (e.g., a virtual eye). In some implementations, the selector 70 determines that the virtual agent 80 cannot interpret and generate a response to the image data 52 based on a lack of the XR eye. More generally, in various implementations, the selector 70 determines the sensory characteristic 82 based on a lack of a component in the XR representation 150.

In some implementations, the virtual agent 80 is configured to (e.g., trained to) interpret and generate a response to the image data 52 when the visual responsiveness value 86 is greater than the visual responsiveness threshold 96. For example, the virtual agent 80 is configured to respond to movements of objects in the physical environment 10 and/or gestures made by the user of the electronic device 20 when the visual responsiveness value 86 is greater than the visual responsiveness threshold 96. As such, in this example, the selector 70 selects the image sensor 50 to provide the image data 52 to the virtual agent 80. In some implementations, the virtual agent is not configured to interpret and generate a response to the image data 52 when the visual responsiveness value 86 is less than the visual responsiveness threshold 96. For example, the virtual agent 80 may not be configured to respond to movements of objects in the physical environment 10 and/or gestures made by the user of the electronic device 20 when the visual responsiveness value 86 is less than the visual responsiveness threshold 96. As such, in this example, the selector 70 does not select the image sensor 50 to provide the image data 52 to the virtual agent 80. In some implementations, when the visual responsiveness value 86 is greater than the visual responsiveness threshold 96, the electronic device 20 manipulates the XR representation 150 of the virtual agent 80 to indicate that the virtual agent 80 is responsive to the image data 52.

In some implementations, the sensory characteristic 82 includes a tactile responsiveness value 88 that indicates a level of responsiveness of the virtual agent 80 to the tactile data 62. In some implementations, the selector 70 selects the tactile sensor 60 to provide the tactile data 62 to the virtual agent 80 when the tactile responsiveness value 88 is greater than a tactile responsiveness threshold 98. In the example of FIG. 1B, the selector 70 does not provide the tactile data 62 to the virtual agent 80 since the tactile responsiveness value 88 is less than the tactile responsiveness threshold 98. In the example of FIG. 1B, the XR representation 150 of the virtual agent 80 does not include an XR nerve (e.g., a virtual nerve for sensing tactile inputs such as touches). In some implementations, the selector 70 determines that the virtual agent 80 cannot interpret and generate a response to the tactile data 62 based on a lack of the XR nerve.

In some implementations, the virtual agent 80 is configured to (e.g., trained to) interpret and generate a response to the tactile data 62 when the tactile responsiveness value 88 is greater than the tactile responsiveness threshold 98. For example, the virtual agent 80 is configured to respond to the XR representation 150 being touched by a collider object that represents a digit or a hand of the user when the tactile responsiveness value 88 is greater than the tactile responsiveness threshold 98. As such, in this example, the selector 70 selects the tactile sensor 60 to provide the tactile data 62 to the virtual agent 80. In some implementations, the virtual agent 80 is not configured to interpret and generate a response to the tactile data 62 when the tactile responsiveness value 88 is less than the tactile responsiveness threshold 98. For example, the virtual agent 80 may not be configured to respond to the XR representation 150 being touched by a collider object that represents a hand of the user when the tactile responsiveness value 88 is less than the tactile responsiveness threshold 98. As such, in this example, the selector 70 does not select the tactile sensor 60 to provide the tactile data 62 to the virtual agent 80. In some implementations, when the tactile responsiveness value 88 is greater than the tactile responsiveness threshold 98, the electronic device 20 manipulates the XR representation 150 of the virtual agent 80 to indicate that the virtual agent 80 is responsive to the tactile data 62.

Figure 1C:
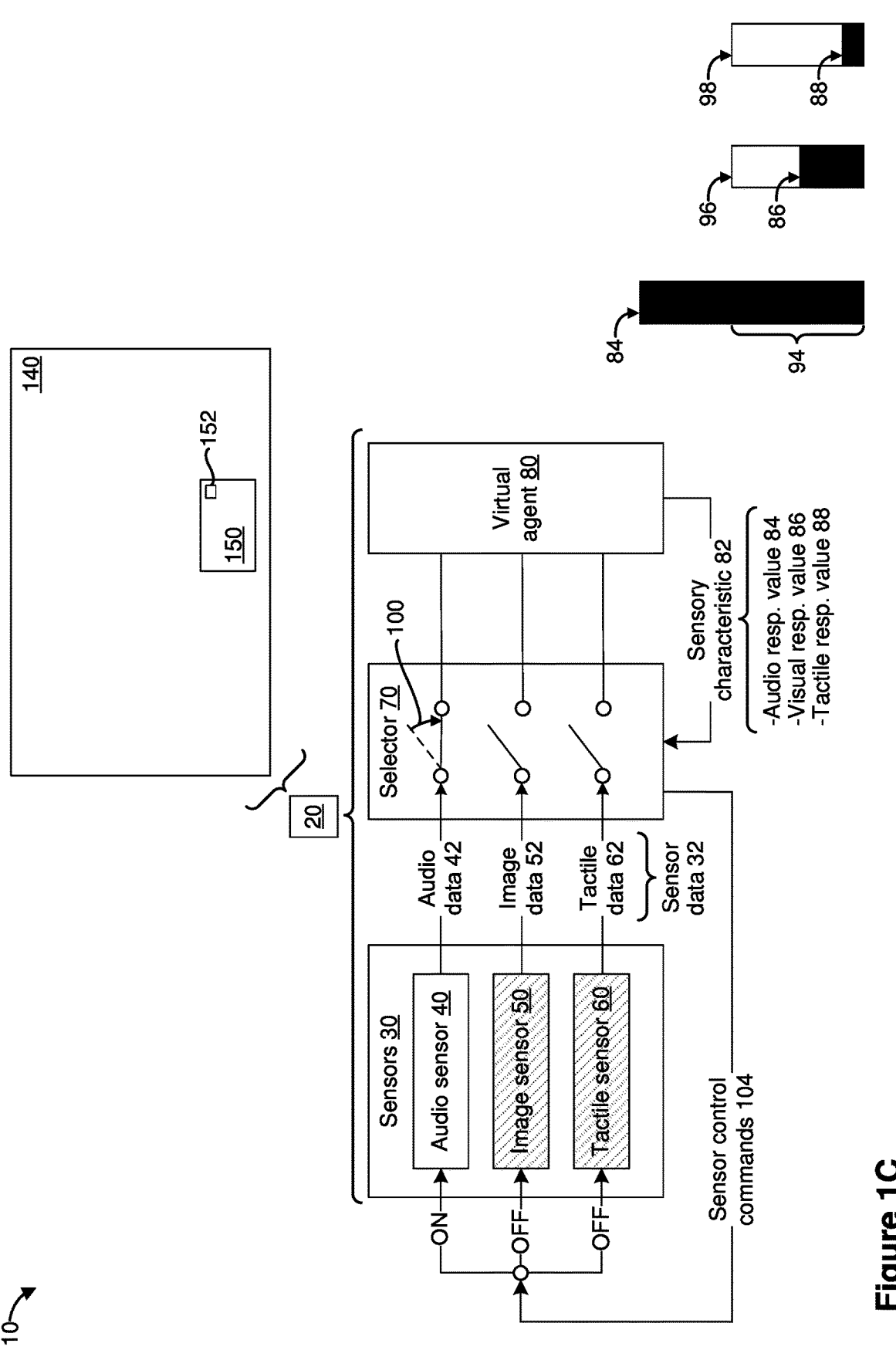

Referring to FIG. 1C, in various implementations, selecting a particular one of the sensors 30 refers to turning that particular sensor 30 on and not selecting a remainder of the sensors 30 refers to turning the remainder of the sensors 30 off in order to conserve power. In some implementations, the selector 70 determines which of the sensors 30 to turn on and which of the sensors 30 to turn off based on the sensory characteristic 82. In the example of FIG. 1C, the selector 70 sends sensor control commands 104 to the sensors 30. The sensor control commands 104 include an on command for the audio sensor 40, for example, because the audio responsiveness value 84 is greater than the audio responsiveness threshold 94. The sensor control commands 104 include off commands for the image sensor 50 and the tactile sensor 60, for example, because the visual responsiveness value 86 is less than the visual responsiveness threshold 96 and the tactile responsiveness value 88 is less than the tactile responsiveness threshold 98. As illustrated by the cross hatching in FIG. 1C, the electronic device 20 turns off the image sensor 50 and the tactile sensor 60 in response to receiving the off commands in order to conserve power.

Figure 1D:
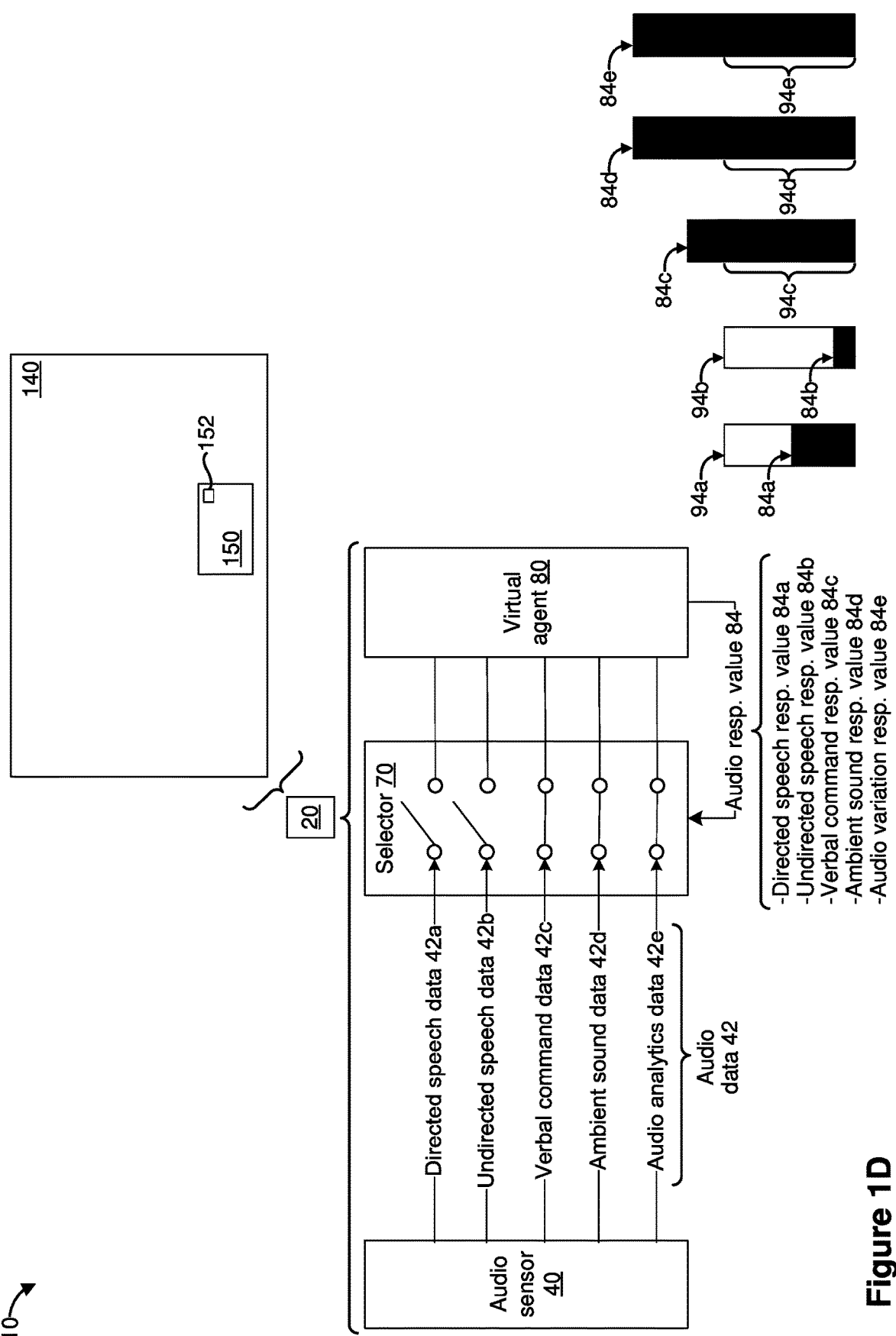

Referring to FIG. 1D, in various implementations, the audio data 42 includes different types of audio data 42. In the example of FIG. 1D, the audio data 42 includes directed speech data 42a that corresponds to a user of the electronic device 20 speaking to the XR representation 150. For example, the user of the electronic device 20 may be trying to have a conversation with the XR representation 150 of the virtual agent 80. The audio data 42 may include undirected speech data 42b that corresponds to the user of the electronic device 20 speaking with someone else. For example, the user of the electronic device 20 may be having a conversation with someone else in the physical environment 10. The audio data 42 may include verbal command data 42c that corresponds to a verbal command that the user of the electronic device 20 is uttering for the XR representation 150 of the virtual agent 80. For example, if the virtual agent 80 represents a dog, the verbal command data 42c may correspond to a sit command. The audio data 42 may include ambient sound data 42d that corresponds to ambient sounds in the physical environment 10 (e.g., environmental sounds such as raindrops falling, wind blowing, a lawnmower being used, etc.). The audio data 42 may include audio analytics data 42e that indicates changes in aural characteristics of sounds detected by the audio sensor 40 (e.g., amplitude changes, frequency changes, etc.).

The virtual agent 80 may be trained to interpret and generate responses to certain types of the audio data 42 and not other types of the audio data 42. The audio responsiveness value 84 may indicate a responsiveness level of the virtual agent 80 to the different types of the audio data 42. In the example of FIG. 1D, the audio responsiveness value 84 includes a directed speech responsiveness value 84a that indicates a responsiveness level of the virtual agent 80 to the directed speech data 42a, an undirected speech responsiveness value 84b that indicates a responsiveness level of the virtual agent 80 to the undirected speech data 42b, a verbal command responsiveness value 84c that indicates a responsiveness level of the virtual agent 80 to the verbal command data 42c, an ambient sound responsiveness value 84d that indicates a responsiveness level of the virtual agent 80 to the ambient sound data 42d, and an audio variation responsiveness value 84e that indicates a responsiveness level of the virtual agent 80 to variations in sounds indicated by the audio analytics data 42e.

In the example of FIG. 1D, the directed speech responsiveness value 84a is less than a directed speech responsiveness threshold 94a, for example, because the virtual agent 80 may not be trained to engage in a conversation with the user of the electronic device 20. For example, if the virtual agent 80 represents a dog, the XR representation 150 of the dog does not engage in a conversation with the user even when the user is talking to the XR representation 150. Since the directed speech responsiveness value 84a is less than the directed speech responsiveness threshold 94a, the selector 70 does not provide the virtual agent 80 with the directed speech data 42a. Similarly, the selector 70 does not provide the virtual agent 80 with the undirected speech data 42b, for example, because the undirected speech responsiveness value 84b is less than an undirected speech responsiveness threshold 94b (e.g., because the virtual agent 80 may not be trained to interpret and respond to a conversation that the user may be having with another person in the physical environment 10).

In the example of FIG. 1D, the verbal command responsiveness value 84c is greater than a verbal command responsiveness threshold 94c, for example, because the virtual agent 80 is trained to interpret and respond to at least some verbal commands. For example, if the virtual agent 80 represents a dog, the virtual agent 80 may be trained to interpret and respond to a "sit" command by animating the XR representation 150 to sit, a "down" command by animating the XR representation 150 to lie down, a "come here" command by manipulating the XR representation 150 to walk towards a point-of-view of the electronic device 20 and a "bark" command by manipulating the XR representation 150 to generate a barking sound. Since the verbal command responsiveness value 84c is greater than the verbal command responsiveness threshold 94c, the selector 70 provides the verbal command data 42c to the virtual agent 80.

In the example of FIG. 1D, the ambient sound responsiveness value 84d is greater than an ambient sound responsiveness threshold 94d, for example, because the virtual agent 80 is trained to interpret and respond to at least some ambient sounds (e.g., at least some environmental sounds). For example, if the virtual agent 80 represents a dog, the virtual agent 80 may be trained to interpret and respond to a lightning sound by manipulating the XR representation 150 to generate a barking sound. Since the ambient sound responsiveness value 84d is greater than the ambient sound responsiveness threshold 94d, the selector 70 provides the ambient sound data 42d to the virtual agent 80.

In the example of FIG. 1D, the audio variation responsiveness value 84e is greater than an audio variation responsiveness threshold 94e, for example, because the virtual agent 80 is trained to interpret and respond to variations in sounds. For example, while the virtual agent 80 may not be trained to interpret sentences spoken by the user, the virtual agent 80 may be trained to interpret and respond to variations in an amplitude and/or a frequency of the user's voice (e.g., the virtual agent 80 may be trained to respond to a whisper, a yell or a whistle from the user). Since the audio variation responsiveness value 84e is greater than the audio variation responsiveness threshold 94e, the selector 70 provides the audio analytics data 42e to the virtual agent 80.

As illustrated in FIG. 1D, the selector 70 provides the verbal command data 42c, the ambient sound data 42d and the audio analytics data 42e to the virtual agent 80 and does not provide the directed speech data 42a and the undirected speech data 42b to the virtual agent 80. In some implementations, not providing the directed speech data 42a and the undirected speech data 42b reduces power consumption by the electronic device 20, for example, because the electronic device 20 does not have to analyze (e.g., interpret) the directed speech data 42a and the undirected speech data 42b. In various implementations, the virtual agent 80 is trained to interpret and generate responses to non-conversational sounds (e.g., non-conversational speech such as whistling, environmental sounds and/or sounds generated by equipment) and not to conversational speech (e.g., full sentences). In such implementations, not providing the audio data corresponding to the conversational speech reduces the need to analyze the audio data corresponding to the conversational speech thereby conserving power and prolonging a usage time of the electronic device 20.

Figure 1E:
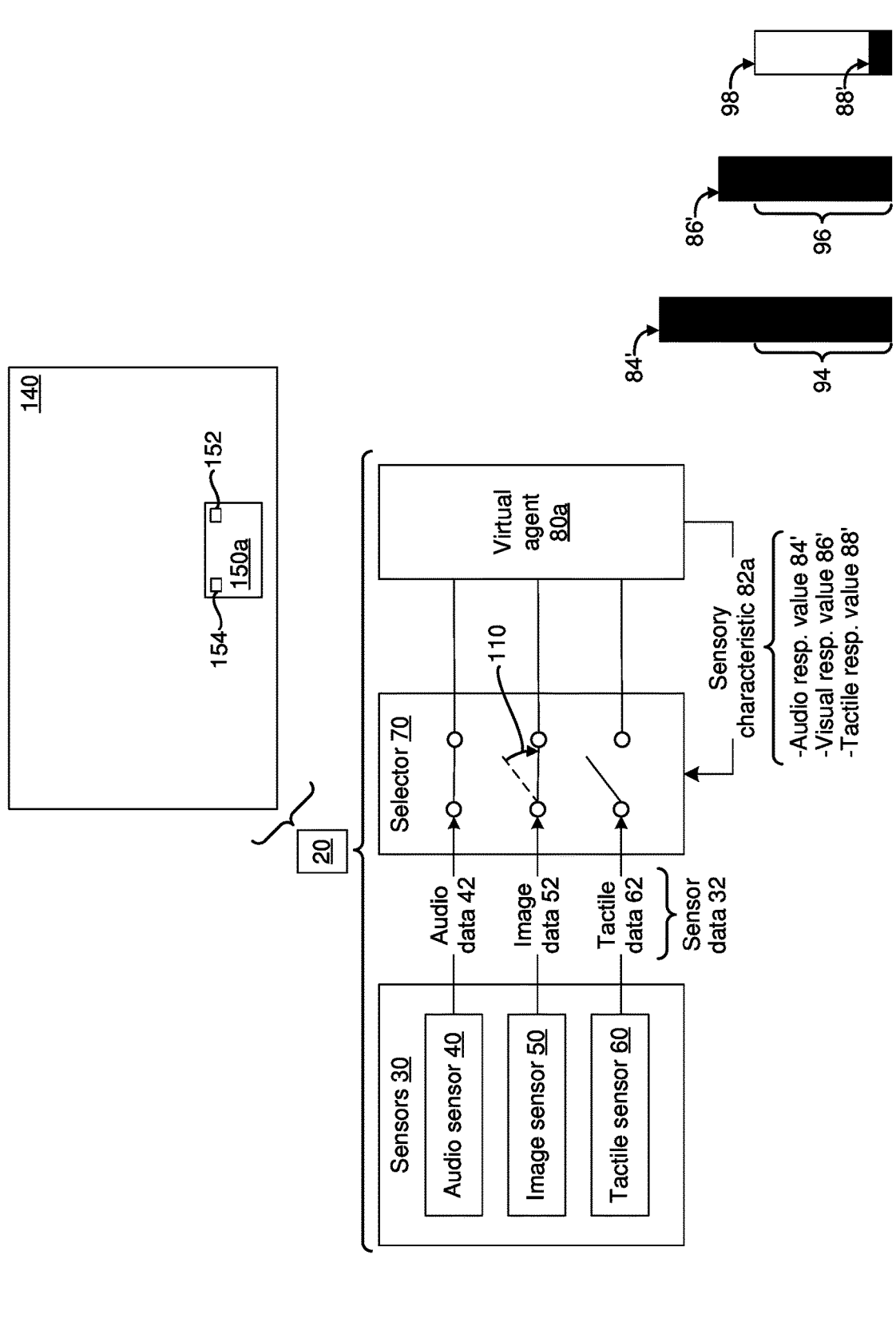

FIG. 1E illustrates a virtual agent 80a that is different from the virtual agent 80 shown in FIGS. 1A-1D. The virtual agent 80a is represented by an XR representation 150a in the XR environment 140. Similar to the XR representation 150 of the virtual agent 80 shown in FIGS. 1A-1D, the XR representation 150a has an XR ear 152. However, the XR representation 150a additionally has an XR eye 154 which indicates that the virtual agent 80a is capable of seeing. As an example, the virtual agent 80a may represent a dog that can hear and see. The virtual agent 80a is associated with a sensory characteristic 82a. The sensory characteristic 82a may indicate an audio responsiveness value 84' that is greater than the audio responsiveness threshold 94, a visual responsiveness value 86' that is greater than the visual responsiveness threshold 96 and a tactile responsiveness value 88' that is less than the tactile responsiveness threshold 98. Since the audio responsiveness value 84' is greater than the audio responsiveness threshold 94, the selector 70 provides the virtual agent 80a with the audio data 42. Since the visual responsiveness value 86' is greater than the visual responsiveness threshold 96, as indicated by an arrow 110, the selector 70 provides the virtual agent 80a with the image data 52. Since the tactile responsiveness value 88' is less than the tactile responsiveness threshold 98, the selector 70 does not provide the virtual agent 80a with the tactile data 62. The electronic device 20 may turn off the tactile sensor 60 or place the tactile sensor 60 in a power conservation mode in order to conserve power. More generally, if the selector 70 does not provide a type of sensor data 32 that is captured by a particular sensor 30 to the virtual agent 80a, the electronic device 20 may turn off that particular sensor 30 or place that particular sensor 30 in a power conservation mode (e.g., that particular sensor 30 may be turned on intermittently in order to intermittently record the type of sensor data 32 that is not being provided to the virtual agent 80*a*) in order to conserve power.

Figure 1F:
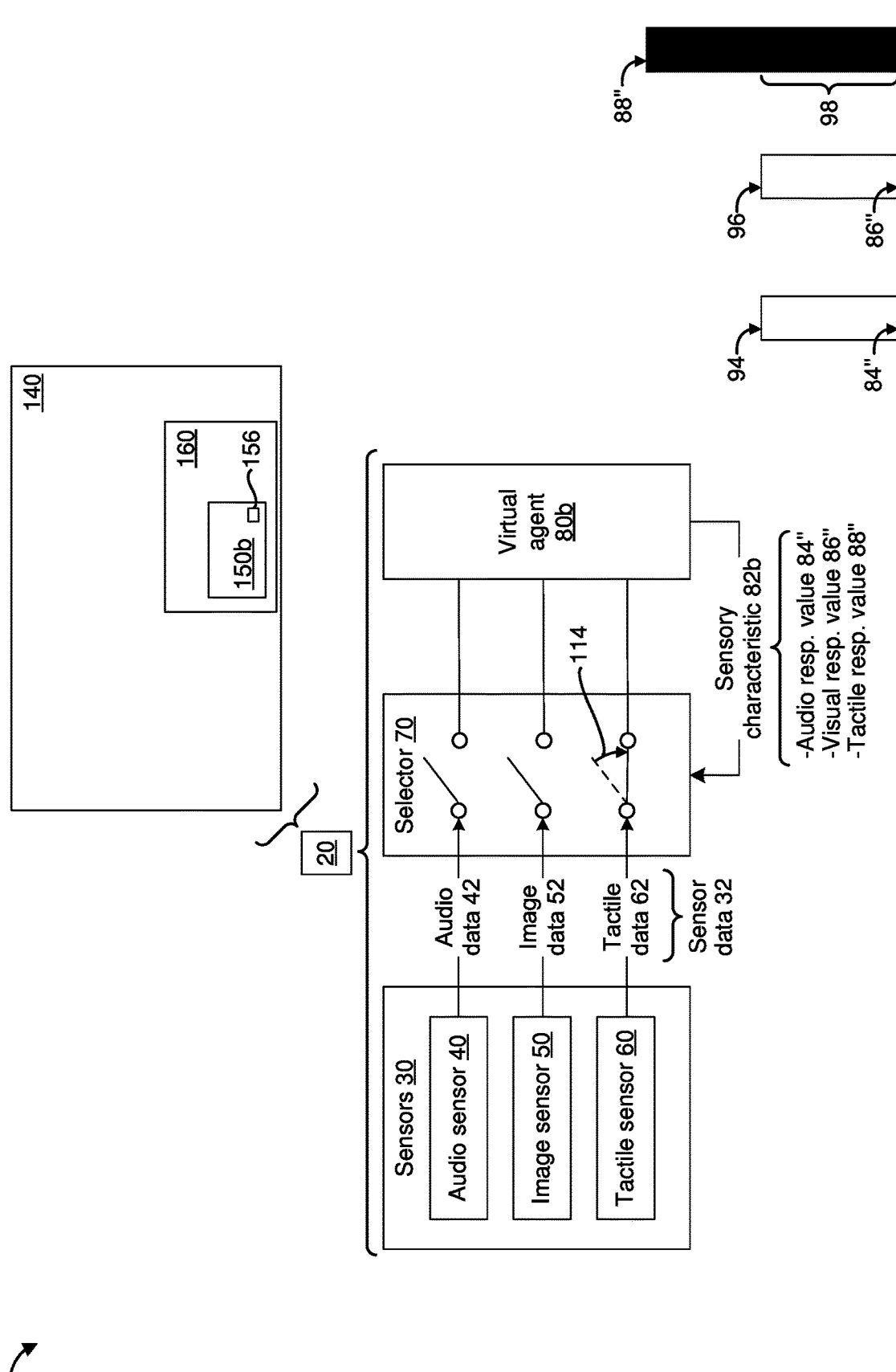

FIG. 1F illustrates a virtual agent 80*b* that is different from the virtual agent 80 shown in FIGS. 1A-1D and the virtual agent 80*a* shown in FIG. 1E. The virtual agent 80*b* is represented by an XR representation 150*b* in the XR environment 140. Unlike the XR representation 150*a* shown in FIG. 1E, the XR representation 150*b* does not have the XR ear 152 or the XR eye 154 which indicates that the virtual agent 80*b* can neither hear sounds nor see anything. However, the XR representation 150*b* has an XR nerve 156 which indicates that the virtual agent 80*b* is capable of tactile sensation. As an example, the virtual agent 80*b* may represent a jellyfish that can neither see nor hear but can sense presence of objects nearby. In the example of FIG. 1F, the jellyfish is shown as swimming in an XR fish tank 160. Via the XR nerve 156, the virtual agent 80*b* representing the jellyfish may detect a presence of another object that is introduced in the XR fish tank 160. For example, the virtual agent 80*b* may detect that the user of the electronic device 20 has inserted his/her hand in the XR fish tank 160. The virtual agent 80*b* is associated with a sensory characteristic 82*b*. The sensory characteristic 82*b* may indicate an audio responsiveness value 84" that is less than the audio responsiveness threshold 94, a visual responsiveness value 86" that is less than the visual responsiveness threshold 96 and a tactile responsiveness value 88" that is greater than the tactile responsiveness threshold 98. Since the audio responsiveness value 84" is less than the audio responsiveness threshold 94, the selector 70 does not provide the virtual agent 80*b* with the audio data 42. Since the visual responsiveness value 86" is less than the visual responsiveness threshold 96, the selector 70 does not provide the virtual agent 80*b* with the image data 52. Since the tactile responsiveness value 88" is greater than the tactile responsiveness threshold 98, as indicated by an arrow 114, the selector 70 provides the virtual agent 80*b* with the tactile data 62. In the example of FIG. 1F, the electronic device 20 may turn off the audio sensor 40 and the image sensor 50 in order to conserve power while keeping the tactile sensor 60 on.

Figure 1G:
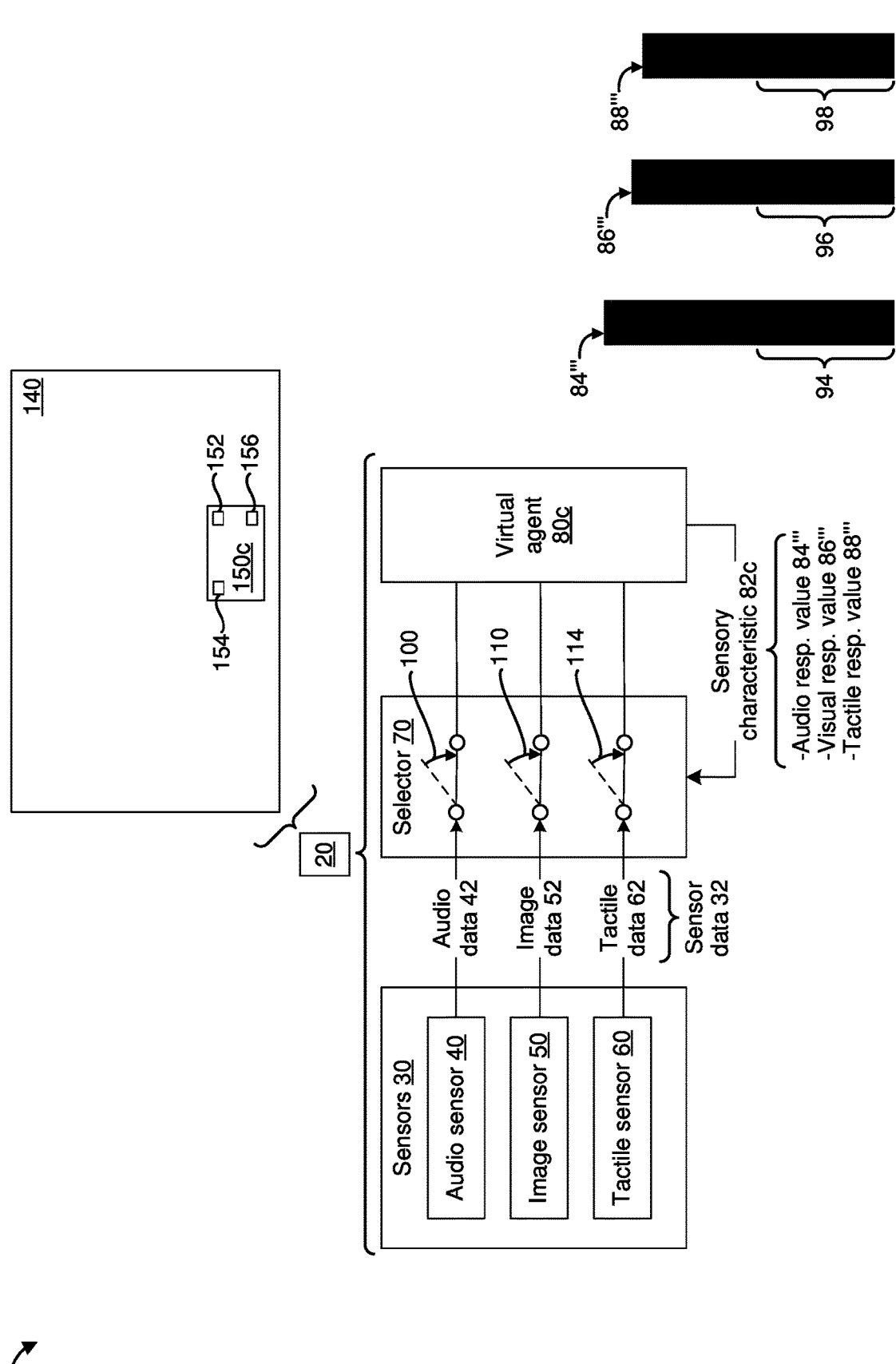

FIG. 1G illustrates a virtual agent 80*c* that is different from the virtual agent 80 shown in FIGS. 1A-1D, the virtual agent 80*a* shown in FIG. 1E and the virtual agent 80*b* shown in FIG. 1F. The virtual agent 80*c* is represented by an XR representation 150*c* in the XR environment 140. The XR representation 150*c* has an XR ear 152, an XR eye 154 and an XR nerve 156 which indicates that the virtual agent 80*c* is capable of listening, seeing and experiencing tactile sensation. As an example, the virtual agent 80*c* may be a humanoid that represents a person or a fictional character from a fictional work. The virtual agent 80*c* is associated with a sensory characteristic 82*c*. The sensory characteristic 82*c* may indicate an audio responsiveness value 84'" that is greater than the audio responsiveness threshold 94, a visual responsiveness value 86'" that is greater than the visual responsiveness threshold 96 and a tactile responsiveness value 88'" that is greater than the tactile responsiveness threshold 98. Since the audio responsiveness value 84'" is greater than the audio responsiveness threshold 94, as indicated by the arrow 100, the selector provides the virtual agent 80*c* with the audio data 42. Since the visual responsiveness value 86'" is greater than the visual responsiveness threshold 96, as indicated by the arrow 110, the selector 70 provides the virtual agent 80*c* with the image data 52. Since the tactile responsiveness value 88'" is greater than the tactile responsiveness threshold 98, as indicated by an arrow 114, the selector 70 provides the virtual agent 80*c* with the tactile data 62.

Figure 1H:
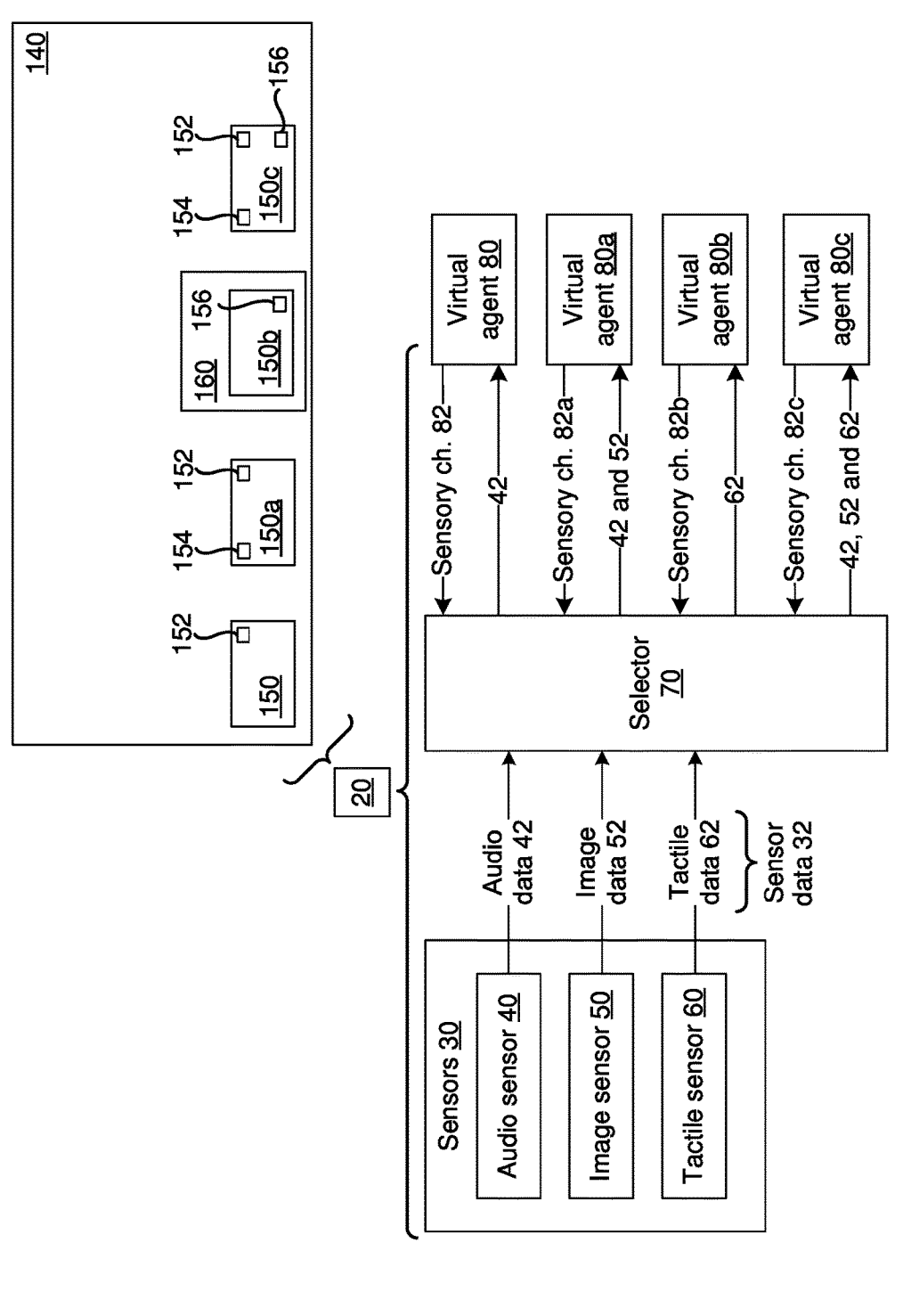

Referring to FIG. 1H, in various implementations, the XR environment 140 includes XR representations of multiple virtual agents. In the example of FIG. 1H, the XR environment 140 includes the XR representations 150, 150*a*, 150*b* and 150*c* for the virtual agents 80*a*, 80*b* and 80*c*, respectively. In some implementations, the selector 70 provides different virtual agents with different types of the sensor data 32 based on the corresponding sensory characteristics of the virtual agents. As shown in FIG. 1H, based on the sensory characteristic 82, the selector 70 provides the virtual agent 80 with the audio data 42, and not the image data 52 and the tactile data 62. Based on the sensory characteristic 82*a*, the selector 70 provides the virtual agent 80*a* with the audio data 42 and the image data 52, and not the tactile data 62. Based on the sensory characteristic 82*b*, the selector 70 provides the virtual agent 80*b* with the tactile data 62, and not the audio data 42 and the image data 52. Based on the sensory characteristic 82*c*, the selector 70 provides the virtual agent 80*c* with the audio data 42, the image data 52 and the tactile data 62.

FIG. 2 is a flowchart representation of a method 200 for selectively providing sensor data to a virtual agent in order to conserve resources. In various implementations, the method 200 is performed by a device (e.g., the electronic device 20 shown in FIGS. 1A-1H). In some implementations, the method 200 is performed by processing logic, including hardware, firmware, software, or a combination thereof. In some implementations, the method 200 is performed by a processor executing code stored in a non-transitory computer-readable medium (e.g., a memory).

As represented by block 210, in various implementations, the method 200 includes displaying, on the display, an environment that includes a representation of a virtual agent that is associated with a sensory characteristic. For example, as shown in FIG. 1A, the electronic device 20 displays the XR environment 140 that includes the XR representation 150 of the virtual agent 80 with the sensory characteristic 82. In some implementations, displaying the environment includes presenting a pass-through representation of a physical environment of the device. For example, displaying the environment may include displaying a video pass-through of the physical environment on an opaque display or presenting an optical see-through of the physical environment on an optical see-through display. In some implementations, displaying the environment includes overlaying the representation of the virtual agent onto the pass-through of the physical environment. In some implementations, the representation includes an avatar of the virtual agent. In some implementations, the representation includes a visible component that indicates the sensory characteristic of the virtual agent. For example, as shown in FIG. 1B, the XR representation 150 includes the XR ear 152 to indicate that the virtual agent 80 is capable of interpreting and responding to sounds generated in the physical environment.

As represented by block 220, in various implementations, the method 200 includes selecting, based on the sensory characteristic associated with the virtual agent, a subset of the plurality of sensors to provide sensor data for the virtual agent. For example, as shown in FIG. 1B, the selector 70 provides the audio data 42 to the virtual agent 80 based on the sensory characteristic 82 indicating that the audio responsiveness value 84 is greater than the audio responsiveness threshold 94. In some implementations, the method 200 includes capturing a first type of sensor data based on the sensory characteristic while forgoing capturing a second type of sensor data that is different from the first type of sensor data based on the sensory characteristic. For example, as shown in FIG. 1C, the selector 70 turns the audio sensor 40 on in order to capture the audio data 42 while turning off the image sensor 50 and the tactile sensor 60 in order to not capture the image data 52 and the tactile data 62 thereby conserving power.

As represented by block 220*a*, in some implementations, the plurality of sensors includes an audio sensor. In some such implementations, the method 200 includes, in response to the sensory characteristic indicating that a responsiveness of the virtual agent to an audio input is greater than a threshold, selecting the audio sensor to capture audible signal data for the virtual agent and providing the audible signal data captured by the audio sensor to the virtual agent. For example, as shown in FIG. 1B, the sensors 30 include the audio sensor 40, and the selector 70 selects the audio sensor 40 to provide the audio data 42 to the virtual agent 80 in response to the audio responsiveness value 84 being greater than the audio responsiveness threshold 94. Selecting the audio sensor 40 to capture the audio data 42 while not selecting the remaining sensors conserves power by keeping the remaining sensors off or in a low power consumption state.

In some implementations, providing the audible signal data captured by the audio sensor to the virtual agent includes determining a type of sound that the audible signal data represents, providing the audible signal data to the virtual agent in response to determining that the audible signal data represents a first type of sound that the virtual agent is configured to interpret and respond to, and forgo providing the audible signal data to the virtual agent in response to determining that the audible signal data represents a second type of sound that the virtual agent is not configured to interpret and respond to. For example, as shown in FIG. 1D, the selector 70 provides the verbal command data 42*c*, the ambient sound data 42*d* and the audio analytics data 42*e* while forgoing providing the directed speech data 42*a* and the undirected speech data 42*b* to the virtual agent 80. In some implementations, the first type of sound is speech that is directed to the virtual agent and the second type of sound is speech that is not directed to the virtual agent. For example, the first type of sound may be represented by the directed speech data 42*a* shown in FIG. 1D and the second type of sound may be represented by the undirected speech data 42*b* shown in FIG. 1D. In some implementations, the first type of sound is an ambient sound that the virtual agent is configured to respond to and the second type of sound is conversational speech that the virtual agent is not configured to respond to. For example, the first type of sound may be represented by the ambient sound data 42*d* and/or the audio analytics data 42*e* shown in FIG. 1D, and the second type of sound may be represented by the directed speech data 42*a* and/or the undirected speech data 42*b* shown in FIG. 1D. As an example, the first type of sound may correspond to a glass dropping in the physical environment that a virtual dog may be trained to detect and respond to whereas the second type of sound may correspond to a phone conversation that the virtual dog may not be trained to interpret and respond to.

In some implementations, providing the audible signal data to the virtual agent includes providing a first portion of the audible signal data in response to determining that the first portion of the audible signal data represents a first type of sound that the virtual agent is configured to interpret and respond to, and forgo providing a second portion of the audible signal data in response to determining that the second portion of the audible signal data represents a second type of sound that the virtual agent is not configured to interpret and respond to. For example, as shown in FIG. 1D, the selector 70 provides a first portion of the audio data 42 that corresponds to the verbal command data 42*c*, the ambient sound data 42*d* and the audio analytics data 42*e* while forgoing providing a second portion of the audio data 42 that corresponds to the directed speech data 42*a* and the undirected speech data 42*b*. In some implementations, the first type of sound is a verbal command that the virtual agent is configured to respond to and the second type of sound is speech that the virtual agent is not configured to respond to. For example, the first type of sound may be represented by the verbal command data 42*c* shown in FIG. 1D and the second type of sound may be represented by the undirected speech data 42*b*. For example, a virtual agent that represents a dog may be trained to detect a "sit" command and manipulate an XR representation of the dog to sit. In this example, the virtual agent that represents the dog may not be trained to interpret and respond to conversational speech (e.g., full sentences being spoken by the user of the device to the XR representation of the virtual dog or to another person in the physical environment).

In some implementations, the method 200 includes determining that a responsiveness of the virtual agent to an audio input is greater than a threshold in response to determining that the virtual agent has virtual ears. For example, as described in relation to FIG. 1B, the selector 70 may determine that the virtual agent 80 is trained to interpret and respond to the audio data 42 in response to the XR representation 150 of the virtual agent 80 having the XR ear 152.

As represented by block 220*b*, in some implementations, the plurality of sensors includes an image sensor. In some such implementations, the method 200 includes, in response to the sensory characteristic indicating that a responsiveness of the virtual agent to a visual input is greater than a threshold, selecting the image sensor to capture image data for the virtual agent and providing the image data captured by the image sensor to the virtual agent. For example, as shown in FIG. 1E, the selector 70 selects the image sensor 50 to provide the image data 52 to the virtual agent 80*a* in response to the visual responsiveness value 86' being greater than the visual responsiveness threshold 96. In some implementations, the method 200 includes determining that a responsiveness of the virtual agent to a visual input is greater than a threshold in response to determining that the virtual agent has virtual eyes. For example, as described in relation to FIG. 1E, the selector 70 may determine to turn on the image sensor 50 and provide the image data 52 captured by the image sensor 50 to the virtual agent 80*a* in response to the XR representation 150*a* of the virtual agent 80*a* having the XR eye 154.

As represented by block 220*c*, in some implementations, the plurality of sensors includes a tactile sensor. In some such implementations, the method 200 includes, in response to the sensory characteristic indicating that a responsiveness of the virtual agent to a tactile input is greater than a threshold, selecting the tactile sensor to capture tactile data for the virtual agent and providing the tactile data captured by the tactile sensor to the virtual agent. For example, as shown in FIG. 1F, the selector 70 selects the tactile sensor 60 to provide the tactile data 62 to the virtual agent 80*b* in response to the tactile responsiveness value 88" being greater than the tactile responsiveness threshold 98. In some implementations, the method 200 includes determining that a responsiveness of the virtual agent to a tactile input is greater than a threshold in response to determining that the virtual agent has virtual nerves to detect tactile inputs. For example, as described in relation to FIG. 1E, the selector 70 may determine to turn on the tactile sensor 60 and provide the tactile data 62 captured by the tactile sensor 60 in response to the XR representation 150*b* of the virtual agent 80*b* having the XR nerve 156.

As represented by block 220*d*, in some implementations, the plurality of sensors includes a first sensor for capturing a first type of sensor data and a second sensor for capturing a second type of sensor data. For example, referring to FIG. 1E, the sensors 30 include the audio sensor 40 for capturing the audio data 42 and the image sensor 50 for capturing the image data 52. In some implementations, the sensory characteristic indicates that the virtual agent has a first level of responsiveness to the first type of sensor data and a second level of responsiveness to the second type of sensor data. In some implementations, the second level of responsiveness is less than the first level of responsiveness. For example, as shown in FIG. 1E, the visual responsiveness value 86' is lower than the audio responsiveness value 84'. In some implementations, selecting the subset of the plurality of sensors comprises utilizing the first sensor to capture the first type of sensor data at a first rate and utilizing the second sensor to capture the second type of sensor data at a second rate that is less than the first rate. In some implementations, the first sensor includes an audio sensor and the second sensor includes an image sensor. In some such implementations, providing the sensor data to the virtual agent includes providing audio data captured by the audio sensor more frequently than image data captured by the image sensor in response to the sensory characteristic indicating that the virtual agent is more responsive to audio inputs than visual inputs. In the example of FIG. 1E, the selector 70 may turn on the audio sensor 40 and provide the audio data 42 to the virtual agent 80*a* more frequently than turning on the image sensor 50 and providing the image data 52 to the virtual agent 80*a*. For example, the selector 70 may provide the audio data 42 to the virtual agent 80*a* continuously whereas the selector 70 may provide the image data 52 to the virtual agent 80*a* intermittently.

As represented by block 220*e*, in some implementations, the method 200 includes determining a battery level of the device, and adjusting a rate at which the sensor data is captured based on the battery level of the device. For example, the lower the battery level, the lower the rate at which the sensor data is captured and provided to the virtual agent in order to prolong the battery life. In some implementations, the method 200 includes determining a temperature of the device, and adjusting a rate at which the sensor data is captured based on the temperature of the device. For example, the higher the temperature, the lower the rate at which the sensor data is captured in order to prevent overheating of the device. In some implementations, the method 200 includes determining an engagement level of a user of the device, and adjusting a rate at which the sensor data is captured based on the engagement level of the user of the device. For example, the less engaged the user is, the lower the rate at which the sensor data is captured. More generally, in various implementations, the method 200 includes adjusting a rate at which the sensor data is captured based on a characteristic of the device and/or the user. In some implementations, the method 200 includes throttling a data capture rate of a lower priority sensor and not throttling a data capture rate of a higher priority sensor. For example, with reference to FIG. 1E, the device may throttle a rate at which the image data 52 is captured and not throttle a rate at which the audio data 42 is captured since a difference between the audio responsiveness value 84' and the visual responsiveness value 86' indicates that the audio sensor 40 has a higher priority than the image sensor 50 for the virtual agent 80*a*.

As represented by block 230, in various implementations, the method 200 includes providing the sensor data captured by the subset of the plurality of sensors to the virtual agent and not capturing sensor data by a remainder of the plurality of sensors in order to reduce power consumption of the device. For example, as shown in FIG. 1B, the selector 70 provides the audio data 42 captured by the audio sensor 40 to the virtual agent 80. In various implementations, the method 200 includes not providing sensor data that can be captured by a remainder of the plurality of sensors in order to conserve resources. In some implementations, the method 200 includes turning off a remainder of the plurality of sensors so that the remainder of the plurality of sensors do not consume power. For example, as shown in FIG. 1C, the selector 70 provides the audio data 42 to the virtual agent 80 and turns off the image sensor 50 and the tactile sensor 60 since the image sensor 50 and the tactile sensor 60 are not providing the image data 52 and the tactile data 62, respectively, to the virtual agent 80. As represented by block 230*a*, in various implementations, the interpretation of the sensor data indicates an intent of a user of the device. In some implementations, the virtual agent utilizes the sensor data captured by the subset of the plurality of sensors for intent recognition. For example, the virtual agent determines (e.g., estimates or infers) an intent of the user based on the sensor data captured by the subset of the plurality of sensors. Capturing a first type of sensor data that the virtual agent is trained to utilize for intent recognition and not capturing a second type of sensor data the virtual agent is not trained to utilize for intent recognition tends to conserve power and prolong an amount of time duration for which the device can be used by the user thereby increasing an operability of the device and enhancing the user experience.

As represented by block 240, in various implementations, the method 200 includes displaying a manipulation of the representation of the virtual agent based on an interpretation of the sensor data by the virtual agent. For example, referring to FIG. 1B, the electronic device 20 displays a manipulation of the XR representation 150 of the virtual agent 80 based on an interpretation of the audio data 42 by the virtual agent 80. The manipulation represents a visual response of the virtual agent to an intent recognized by the virtual agent. As represented by block 240*a*, in some implementations, displaying the manipulation includes animating the representation of the virtual agent in accordance with an animation clip in order to provide an appearance that the representation of the virtual agent is performing an action. For example, if the virtual agent represents a dog, the electronic device may manipulate the representation of the virtual agent in accordance with a sitting animation clip in response to the audio data including a sit command. In some implementations, the method 200 includes generating an audio response. In such implementations, the electronic device 20 outputs an audible signal and manipulates the representation of the virtual agent to provide an appearance that the representation of the virtual agent uttered the audible signal. For example, if the response is for a virtual dog to bark, the electronic device can animate the virtual dog in accordance with a barking clip which causes the virtual dog's mouth to open while the electronic device plays a barking sound via a speaker.

In some implementations, the method 200 includes utilizing a motion planner to generate a motion plan and manipulating the representation of the virtual agent in accordance with the motion plan generated by the motion planner. In some implementations, an amount of motion planning (e.g., a degree of motion planning) performed by the motion planner is a function of a state of the device. For example, the device may decrease an amount of motion planning for a virtual agent as a battery level of the device decreases in order to conserve battery. As another example, the device may decrease an amount of motion planning for a virtual agent as a temperature of the device increases in order to prevent overheating of the device. In various implementations, the method 200 includes changing the sensory characteristic of the virtual agent based on a state of the device. For example, the device can reduce a responsiveness level (e.g., the responsiveness values 84, 86 and 88 shown in FIG. 1B) of the virtual agent as the battery level decreases in order to conserve battery and/or as the device temperature increases in order to prevent overheating of the device. In some implementations, the method 200 includes throttling capabilities of the virtual agent as the battery level of the device decreases and/or as the device temperature increases. Throttling the capabilities of the virtual agent may result in the representation of the virtual agent performing fewer advanced actions and more primitive actions that may require less motion planning thereby prolonging the battery of the device.

Figure 3:
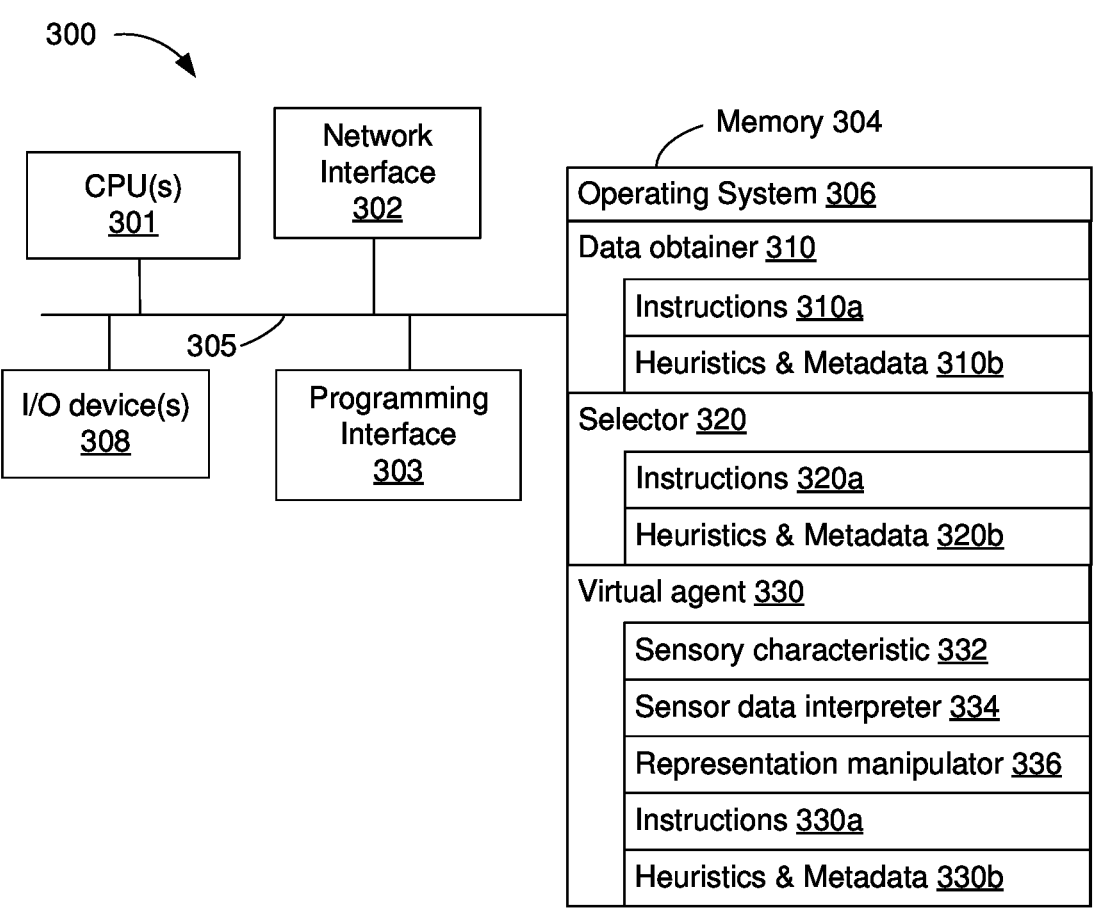
FIG. 3 is a block diagram of a device that selectively provides sensor data to a virtual agent in accordance with some implementations.

FIG. 3 is a block diagram of a device 300 in accordance with some implementations. In some implementations, the device 300 implements the electronic device 20 shown in FIGS. 1A-1H. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 300 includes one or more processing units (CPUs) 301, a network interface 302, a programming interface 303, a memory 304, one or more input/output (I/O) devices 308, and one or more communication buses 305 for interconnecting these and various other components.

In some implementations, the network interface 302 is provided to, among other uses, establish and maintain a metadata tunnel between a cloud hosted network management system and at least one private network including one or more compliant devices. In some implementations, the one or more communication buses 305 include circuitry that interconnects and controls communications between system components. The memory 304 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 304 optionally includes one or more storage devices remotely located from the one or more CPUs 301. The memory 304 comprises a non-transitory computer readable storage medium.

In some implementations, the one or more I/O devices 308 include various sensors (e.g., the sensors 30 shown in FIGS. 1A-1H). In some implementations, the sensors include a physical sensor that detects a physical characteristic of a physical environment of the device 300 and/or a user of the device 300. In some implementations, the sensors include a virtual sensor that detects a virtual characteristic of an XR environment that the device 300 is presenting. In some implementations, the sensors include an audio sensor (e.g., the audio sensor 40 shown in FIGS. 1A-1H, for example, a microphone) for capturing audio data (e.g., the audio data 42 shown in FIG. 1A-1H). In some implementations, the sensors include an image sensor (e.g., the image sensor 50 shown in FIGS. 1A-1H, for example, a camera such as a visible light camera or an infrared light camera) for capturing image data (e.g., the image data 52, for example, images of the physical environment and/or the user of the device 300). In some implementations, the sensors include a depth sensor (e.g., a depth camera) for capturing depth data. In some implementations, the sensors include a tactile sensor (e.g., the tactile sensor 60) for capturing tactile data (e.g., the tactile data 62 shown in FIGS. 1A-1H). In various implementations, the one or more I/O devices 308 include an environmental sensor for capturing environmental data. For example, in some implementations, the sensors include a temperature sensor for capturing temperature readings (e.g., an ambient temperature sensor for capturing ambient temperature readings and/or a surface temperature sensor for capturing surface temperature readings). In some implementations, the sensors include a pressure sensor for capturing pressure readings (e.g., an atmospheric pressure sensor for capturing atmospheric pressure readings). In some implementations, the sensors include an ambient light sensor (ALS) for detecting an ambient lighting level. In some implementations, the sensors include implantable sensors that can be implanted within a user of the device (e.g., a continuous glucose monitor (CGM)). In some implementations, the sensors include wearable sensors that can be worn by a user of the device 300 (e.g., around a finger of the user, a wrist of the user, a waist of the user, an ankle of the user, an arm of the user or a head of the user).

In some implementations, the one or more I/O devices 308 include an input device for obtaining a user input (e.g., a touchscreen for detecting user inputs). In some implementations, the one or more I/O devices 308 include a display for displaying the representation of the virtual agent. In various implementations, the one or more I/O devices 308 include a video pass-through display which displays at least a portion of a physical environment surrounding the device 300 as an image captured by a camera. In various implementations, the one or more I/O devices 308 include an optical see-through display which is at least partially transparent and passes light emitted by or reflected off the physical environment.

In some implementations, the memory 304 or the non-transitory computer readable storage medium of the memory 304 stores the following programs, modules and data structures, or a subset thereof including an optional operating system 306, a data obtainer 310, a selector 320 (e.g., the selector 70 shown in FIGS. 1A-1H) and a virtual agent 330 with a sensory characteristic 332 (e.g., the virtual agent 80 with the sensory characteristic 82 shown in FIGS. 1A-1D, the virtual agent 80a with the sensory characteristic 82a shown in FIG. 1E, the virtual agent 80b with the sensory characteristic 82b shown in FIG. 1F, and/or the virtual agent 80c with the sensory characteristic 82c shown in FIG. 1G). In various implementations, the device 300 performs the method 200 shown in FIG. 2.

In some implementations, the data obtainer 310 includes instructions 310a, and heuristics and metadata 310b for obtaining the sensory characteristic 332 (e.g., the sensory characteristic 82 shown in FIGS. 1A-1C, the sensory characteristic 82a shown in FIG. 1E, the sensory characteristic 82b shown in FIG. 1F, and the sensory characteristic 82c shown in FIG. 1G) and sensor data from some of the sensors based on the sensory characteristic 332. In some implementations, the data obtainer 310 performs at least some of the operation(s) represented by blocks 220 and 230 in FIG. 2.

In some implementations, the selector 320 includes instructions 320*a*, and heuristics and metadata 320*b* for selecting a subset of the sensors based on the sensory characteristic 332 of the virtual agent 330. In some implementations, the selector 320 performs at least some of the operation(s) represented by blocks 220 and 230 in FIG. 2.

In some implementations, the virtual agent 330 includes a sensor data interpreter 334 that interprets (e.g., analyzes) the sensor data captured by the sensors selected by the selector 320. In some implementations, the virtual agent 330 includes a representation manipulator 336 that manipulates a representation of the virtual agent 330 based on the interpretation of the sensor data by the sensor data interpreter 334. To that end, the virtual agent 330 includes various instructions 330*a*, and heuristics and metadata 330*b*. In some implementations, the virtual agent 330 performs at least some of the operation(s) represented by blocks 210 and 240 in FIG. 2.

It will be appreciated that FIG. 3 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 3 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
    at a device including a display, a plurality of sensors, a
        non-transitory memory and one or more processors:
        displaying, on the display, an environment that includes
            a representation of a virtual agent that is associated
            with a sensory characteristic;
        selecting, based on the sensory characteristic associated
            with the virtual agent, a subset of the plurality of
            sensors to provide sensor data for the virtual agent;
        providing the sensor data captured by the subset of the
            plurality of sensors to the virtual agent in order to
            reduce power consumption of the device;

displaying a manipulation of the representation of the
            virtual agent based on an interpretation of the sensor
            data by the virtual agent;
        determining a battery level of the device; and
        adjusting a rate at which the sensor data is captured
            based on the battery level of the device.

2. The method of claim 1, wherein the plurality of sensors includes an audio sensor; and
    in response to the sensory characteristic indicating that a
        responsiveness of the virtual agent to an audio input is
        greater than a threshold, selecting the audio sensor to
        capture audible signal data for the virtual agent and
        providing the audible signal data captured by the audio
        sensor to the virtual agent.

3. The method of claim 2, wherein providing the audible signal data captured by the audio sensor to the virtual agent comprises:
    determining a type of sound that the audible signal data
        represents;
    providing the audible signal data to the virtual agent in
        response to determining that the audible signal data
        represents a first type of sound that the virtual agent is
        configured to interpret and respond to; and
    forgo providing the audible signal data to the virtual agent
        in response to determining that the audible signal data
        represents a second type of sound that the virtual agent
        is not configured to interpret and respond to.

4. The method of claim 2, wherein providing the audible signal data to the virtual agent comprises:
    providing a first portion of the audible signal data in
        response to determining that the first portion of the
        audible signal data represents a first type of sound that
        the virtual agent is configured to interpret and response
        to; and
    forgo providing a second portion of the audible signal data
        in response to determining that the second portion of
        the audible signal data represents a second type of
        sound that the virtual agent is not configured to interpret and respond to.

5. The method of claim 4, wherein the first type of sound is speech that is directed to the representation of the virtual agent and the second type of sound is speech that is not directed to the representation of the virtual agent.

6. The method of claim 4, wherein the first type of sound is a verbal command that the virtual agent is configured to respond to and the second type of sound is speech that the virtual agent is not configured to respond to.

7. The method of claim 4, wherein the first type of sound is an ambient sound that the virtual agent is configured to respond to and the second type of sound is conversational speech that the virtual agent is not configured to respond to.

8. The method of claim 2, further comprising determining that the responsiveness of the virtual agent to the audio input is greater than the threshold in response to determining that the representation of the virtual agent has virtual ears.

9. The method of claim 1, wherein the plurality of sensors includes an image sensor; and
    in response to the sensory characteristic indicating that a
        responsiveness of the virtual agent to a visual input is
        greater than a threshold, selecting the image sensor to
        capture image data for the virtual agent and providing
        the image data captured by the image sensor to the
        virtual agent.

10. The method of claim 9, further comprising determining that the responsiveness of the virtual agent to the visual input is greater than the threshold in response to determining that the representation of the virtual agent has virtual eyes.

11. The method of claim 1, wherein the plurality of sensors includes a tactile sensor; and in response to the sensory characteristic indicating that a responsiveness of the virtual agent to a tactile input is greater than a threshold, selecting the tactile sensor to capture tactile data for the virtual agent and providing the tactile data captured by the tactile sensor to the virtual agent.

12. The method of claim 11, further comprising determining that the responsiveness of the virtual agent to the tactile input is greater than the threshold in response to determining that the representation of the virtual agent has virtual nerves to detect tactile inputs.

13. The method of claim 1, wherein the plurality of sensors includes a first sensor for capturing a first type of sensor data and a second sensor for capturing a second type of sensor data;

wherein the sensory characteristic indicates that the virtual agent has a first level of responsiveness to the first type of sensor data and a second level of responsiveness to the second type of sensor data, wherein the second level of responsiveness is less than the first level of responsiveness; and wherein selecting the subset of the plurality of sensors comprises utilizing the first sensor to capture the first type of sensor data at a first rate and utilizing the second sensor to capture the second type of sensor data at a second rate that is less than the first rate.

14. The method of claim 13, wherein the first sensor comprises an audio sensor and the second sensor comprises an image sensor; and wherein providing the sensor data to the virtual agent comprises providing audio data captured by the audio sensor more frequently than image data captured by the image sensor in response to the sensory characteristic indicating that the virtual agent is more responsive to audio inputs than visual inputs.

15. The method of claim 1, further comprising:
determining a temperature of the device; and
adjusting a rate at which the sensor data is captured based on the temperature of the device.

16. The method of claim 1, further comprising:
determining an engagement level of a user of the device; and
adjusting a rate at which the sensor data is captured based on the engagement level of the user of the device.

17. The method of claim 1, wherein the interpretation of the sensor data indicates an intent of a user of the device.

18. A device comprising:
one or more processors;
a plurality of sensors, wherein the plurality of sensors includes a first sensor for capturing a first type of sensor data and a second sensor for capturing a second type of sensor data;
a display;
a non-transitory memory; and
one or more programs stored in the non-transitory memory, which, when executed by the one or more processors, cause the device to:
display, on the display, an environment that includes a representation of a virtual agent that is associated with a sensory characteristic, wherein the sensory characteristic indicates that the virtual agent has a first level of responsiveness to the first type of sensor data and a second level of responsiveness to the second type of sensor data, and wherein the second level of responsiveness is less than the first level of responsiveness;
select, based on the sensory characteristic associated with the virtual agent, a subset of the plurality of sensors to provide sensor data for the virtual agent, including utilizing the first sensor to capture the first type of sensor data at a first rate and utilizing the second sensor to capture the second type of sensor data at a second rate that is less than the first rate;
provide the sensor data captured by the subset of the plurality of sensors to the virtual agent in order to reduce power consumption of the device; and
display a manipulation of the representation of the virtual agent based on an interpretation of the sensor data by the virtual agent.

19. The device of claim 18, wherein the one or more programs, which, when executed, further cause the device to:
determine a battery level of the device; and
adjust a rate at which the sensor data is captured based on the battery level of the device.

20. The device of claim 18, wherein the one or more programs, which, when executed, further cause the device to:
determine a temperature of the device; and
adjust a rate at which the sensor data is captured based on the temperature of the device.

21. The device of claim 18, wherein the one or more programs, which, when executed, further cause the device to:
determine an engagement level of a user of the device; and
adjust a rate at which the sensor data is captured based on the engagement level of the user of the device.

22. A non-transitory memory storing one or more programs, which, when executed by one or more processors of a device including a plurality of sensors and a display, cause the device to:
display, on the display, an environment that includes a representation of a virtual agent that is associated with a sensory characteristic;
select, based on the sensory characteristic associated with the virtual agent, a subset of the plurality of sensors to provide sensor data for the virtual agent;
provide the sensor data captured by the subset of the plurality of sensors to the virtual agent in order to reduce power consumption of the device;
display a manipulation of the representation of the virtual agent based on an interpretation of the sensor data by the virtual agent;
determine an engagement level of a user of the device; and
adjust a rate at which the sensor data is captured based on the engagement level of the user of the device.

23. The non-transitory memory of claim 22, wherein the one or more programs, which, when executed, further cause the device to:
determine a battery level of the device; and
adjust a rate at which the sensor data is captured based on the battery level of the device.

24. The non-transitory memory of claim 22, wherein the plurality of sensors includes a first sensor for capturing a first type of sensor data and a second sensor for capturing a second type of sensor data;
wherein the sensory characteristic indicates that the virtual agent has a first level of responsiveness to the first type of sensor data and a second level of responsive-
ness to the second type of sensor data, wherein the
second level of responsiveness is less than the first level
of responsiveness; and wherein selecting the subset of the plurality of sensors
comprises utilizing the first sensor to capture the first
type of sensor data at a first rate and utilizing the second
sensor to capture the second type of sensor data at a
second rate that is less than the first rate.

* * * * *